United States Patent Office 3,278,489
Patented Oct. 11, 1966

3,278,489
THERMALLY STABLE COPOLYMERS OF TRIOXANE AND CYCLIC DISULFIDES AND PROCESS FOR MAKING THE SAME
Philip Bernstein, Yardley, and George F. Bulbenko, Levittown, Pa., assignors to Thiokol Chemical Corporation, Bristol, Pa., a corporation of Delaware
No Drawing. Filed Sept. 27, 1962, Ser. No. 226,717
12 Claims. (Cl. 260—67)

The present invention relates to novel, high molecular weight copolymers and, in particular, to solid copolymers of trioxane and certain organic cyclic disulfide compounds. These copolymers exhibit a high degree of thermal stability without the necessity of adding antioxidants or other stabilizing compounds.

Solid, high-molecular-weight polymers of formaldehyde and trioxane, a cyclic trimer of formaldehyde, are commonly known to those skilled in the art as polyoxymethylene polymers. Such polymers have utility as molding and extrusion materials in the plastics fabrication industry. However, the utility of polyoxymethylene polymers has heretofore been limited because of their tendency to decompose into formaldehyde and its lower molecular weight polymers when subjected to the heat cycles encountered during fabrication procedures common in the industry. Prior efforts to improve the stability of these polymers, such as for example the addition of anti-oxidants thereto, have not been entirely successful.

It is an object of the present invention to achieve a solid, high molecular weight polymer which may be used beneficially in the high-temperature molding and extrusion arts without antioxidant additives. It is another object of the invention to provide a polymer of this type having the favorable physical and chemical properties inherent in polyoxymethylene polymers. It is a further object of the invention to provide a process whereby such solid, high molecular weight, thermally stable polymers may be readily and economically produced. Other objects of the invention are in part pointed out hereinafter.

The objects and advantages of the present invention can be achieved by copolymerizing trioxane, in the presence of a Friedel-Crafts type catalyst, with at least one co-monomer which is a cyclic disulfide having the two sulfur atoms adjacent. It has been discovered that when such a polymerization is carried out in accordance with the procedures described below, both the aforementioned cyclic disulfide ring structure and the trioxane ring structure open up to allow the resulting open-chain units to unite with each other in linear copolymers which are novel in the art and which embody the present invention. More particularly, it has been found that improved polyoxymethylene copolymers can be obtained by polymerizing trioxane with one or more co-monomers having the structure

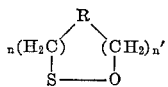

where $n$ and $n'$ are selected from the integers 1 to 4, and R is selected from the group consisting of —CH$_2$—, —O— and —O—CH$_2$—O—. In the preferred copolymers, $n$ and $n'$ are either 1 or 2. The copolymers of the present invention contain from 0.01% to 25% by weight and, preferably 2 to 8% by weight, of the cyclic disulfide co-monomers randomly distributed among the recurring —CH$_2$O— units which comprise the greater portion of the backbone of the resulting linear copolymers.

Representative of the cyclic disulfides which may be copolymerized with trioxane according to the present invention are the following compounds 1,2-dithiacyclopentane

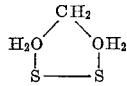

1,2-dithiacycloheptane

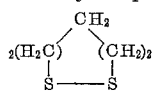

1 oxa-4,5-dithiacycloheptane

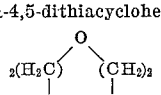

1,3-dioxa-6,7-dithiacyclononane

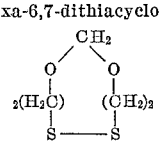

The copolymers of the present invention are solid, white, granular, free-flowing materials which may be used for high temperature molding and extrusion applications without use of antioxidant additives. When subjected to temperatures of 220° C., the copolymers lose less than 40% of their weight in 2 hours.

The copolymers have a thermal degradation reaction rate ($k_{222}$) of less than 1 at 222° C. The constant is determined by subjecting the polymer to a temperature of 222° C. and plotting the logarithm of the weight percent of polymer remaining undegraded against the time in minutes from the beginning of the test period. The reaction rate constant mentioned here is 2.303 times the slope of the line so obtained.

The present copolymers are substantially insoluble in water and common organic solvents such as ethers, alcohols, and aliphatic and aromatic hydrocarbons. They have an inherent viscosity of about 0.5 to 2.0 in p-chlorophenol containing 2% by weight of alpha-pinene at 60° C. The "inherent viscosity," used herein, is determined by dividing the logarithm of the relative viscosity by the polymer concentration when the concentration is 0.5 gram of polymer per 100 ml. of solvent. The copolymers have a melting point of about 180°–185° C.

The copolymers of the present invention are produced, as noted above, by copolymerizing trioxane with one or more of the above-described cyclic disulfide compounds in the presence of a Friedel-Crafts type of catalyst. The catalyst should be added to the polymerization system after the trioxane and cyclic disulfide have been mixed. It may be added all at once or in increments to achieve better control of the speed with which the reaction proceeds. Any of the known Friedel-Crafts type catalysts may be used in the process of the present invention. Boron trifluoride catalysts have been found especially useful. Complexes of boron trifluoride with materials such as those mentioned in U.S. Patent 3,027,352 are preferred. Amounts of catalysts as low as almost 0.01% of the total weight of the monomers can be used. The amount of catalyst that produces a good effect will of course vary as a function of its chemical structure. In the case of, for example, BF$_3$.O(C$_2$H$_5$)$_2$ the amount of catalyst used is desirably at least about 0.05% by weight. Larger amounts of catalyst can be used; however, it is preferable to use as little catalyst as possible to avoid the necessity of extensive reprocessing to remove spent catalyst residue from the copolymer product.

The polymerization reaction can be conducted, according to the present invention by the use of such techniques as solution or bulk polymerization. The polymerization is preferably conducted in bulk at a temperature of about 80° C.±15° C. In the method of the present invention, there is no need for conducting the polymerization under pressure or in an atmosphere of inert gas. Using bulk polymerization techniques, the polymerization reaction starts almost instantaneously upon the addition of the catalyst to the reaction system.

Solvents like nitrobenzene can be used for the polymerization medium where the polymerization is conducted in solution. The yields obtained in solution polymerization, are not usually as good as those obtained with bulk polymerization. Furthermore, the products obtained by solution polymerization are usually more difficult to separate and purify. The polymerization temperatures employed in the solution polymerization procedures range from about room temperature to the boiling point of the solvent employed and are preferably about 90 to 95° C.

In order to obtain a copolymer of the highest thermal stability, it is desirable to wash the copolymer product with water at elevated temperatures to decompose and remove the catalyst residue therefrom. Solvents such as methanol, ethanol, ether and acetone may be used to wash the copolymer product free of unreacted trioxane and cyclic disulfide materials. The thermal stability of the copolymers of the present invention may also be enhanced by capping the copolymers with acid anhydrides and similar capping agents.

The trioxane used in the polymerization process of the present invention may be of the usual commercial grade which contains about 99% trioxane.

In order to point out more fully the nature of the present invention, the following specific examples are given of illustrative embodiments of the present process and products produced thereby.

*Example 1*

Fifty ml. of nitrobenzene, containing 15 grams of trioxane which had been previously melted and filtered free of homopolymer, was added to a 250 ml. round-bottom flask equipped with a stirrer. To this was added 5 grams of 1-oxa-4,5 dithiacycloheptane with stirring, followed by 1 ml. of nitrobenzene containing 0.056 gram of $BF_3.O(C_2H_5)_2$ catalyst at room temperature (i.e., 23° C.). The reaction mixture was stirred overnight at about this temperature. Solid particles formed which were separated from the remaining liquid by filtration, washed with methanol and diethyl ether, and dried under vacuum.

A particulate, dry, free-flowing solid was obtained which weighed 8.7 grams. It had a melting range of 185°–195° C., and an average sulfur content of 10.04% by weight. This sulfur content corresponds to a copolymer comprising about 20% by weight of units formed by the opening of the co-monomer ring of 1-oxa-4,5 dithiacycloheptane. Flexible films with good physical properties were prepared from the melted copolymer product. The particulate copolymer was also compression-molded to form discs. The inherent viscosity of the copolymer in p-chlorophenol containing 2% alpha-pinene at 60° C. was 0.65.

*Example 2*

30 grams of polymer-free trioxane and 1.27 grams of 1-oxa 4,5-dithiacycloheptane were placed into an Erlenmeyer flask equipped with a stirrer. The reactants were mixed at about 90° C. on a hot plate until a clear and uniform melt was formed. To this 0.011 gram of $BF_3.O(C_2H_5)_2$ was added. After 10 seconds, another 0.011 gram of $BF_3.O(C_2H_5)_2$ was added. Bulk polymerization started as soon as the second portion of catalyst was added. Stirring was stopped, whereupon the entire contents of the flask solidified to form a white product. The product was aged for two hours, removed from the flask, fragmented in methanol with diethyl ether, and dried to form a free-flowing, particulate, white solid. This polymer product was agitated in boiling water for about 3–4 hours and dried under vacuum at 60° C. to form 16 grams of a particulate, dry, free-flowing, white solid having a melting range of 185° to 190° C.

Separate portions of the copolymer product were then melted to form flexible films, drawn out to form fibers, and pressed out at 5000 p.s.i. and 160° C. to form molded discs. It was found that the films could be folded through 360° along a single line more than 100 times without mechanical failure. The fibers, films, and discs showed no discoloration due to the heat of processing.

*Example 3*

Employing the procedure described in Example 2, 30 grams of trioxane was copolymerized with 0.075 gram of 1,2-dithiacyclopentane to form a dry, free-flowing, white particulate product. Analysis of the product showed that it contained 0.60% by weight of sulfur which corresponds to a co-monomer to trioxane molar ratio of 0.0088, or 0.03% by weight of co-monomer units in the copolymer. The copolymer was pressed into the form of a disc at 5000 p.s.i. and 160° C. When subjected to a temperature of 150° C. for 24 hours, it sustained a loss in weight of 35%. A homopolymer of oxymethylene units, prepared in similar fashion, sustained a loss in weight of 100% upon being subjected to a temperature of 150° C. for 24 hours.

*Example 4*

Using the procedure described in Example 2, 30 grams of trioxane was copolymerized with 1.087 grams of 1,2-dithiacycloheptane to form a dry, free-flowing, white, particulate product. This material contained 2.38% by weight of sulfur which corresponds to a copolymer having a molar ratio of co-monomer units to trioxane units of 0.039%, or 4.98% by weight of co-monomer units in the copolymer. The copolymer was pressed into the form of a disc at 5000 p.s.i. and 160° C. Upon being subjected to a temperature of 150° C. for 24 hours, it sustained a loss in weight of 21%.

*Example 5*

A dry, free-flowing, white, particulate, copolymer was formed from 30 grams of trioxane and 1.316 grams of 1,3-dioxa-6,7 dithiacyclononane, using the procedure described in Example 2.

The product has a sulfur content of 2.0% by weight, which corresponds to a copolymer having 5.25% by weight of the co-monomer units.

The copolymer product was pressed into the form of a disc at 5000 p.s.i. and 160° C. and was then subjected to a temperature of 150° C. for 24 hours, during which time it sustained a 14% loss in weight.

*Example 6*

A mixture of 30 grams of filtered trioxane and 1.33 grams of dithiacycloheptane was heated to 90° C., and 0.02 ml. of $BF_3$ etherate was added to the homogeneous mixture. The system polymerized after about one minute. The polymer was allowed to stand overnight at room temperature. The resulting solid was ground in a Waring Blendor, washed twice with successive washings of methanol and ether, and agitated in boiling water for 1.5 hours. The material remained in the water at about 23° C. overnight. The product was recovered as in Example 2. The inherent viscosity, measured at 60° C. in p-chlorophenol with 2% alpha-pinene, was 1.07. The $k_{222}$ value of the polymer was less than 1.

*Example 7*

A mixture of 1200 grams of polymer-free trioxane and 40 cc. of 1-oxa-4,5-dithiacycloheptane were heated to 93° C. with constant agitation. Thereupon, 0.02 cc. of $BF_3$ etherate was added to the mixture. An additional 0.8 cc.

of BF₃ was added. Polymerization took place within one minute after this second addition of catalyst. The system was allowed to stand overnight at room temperature. Total yield was 986 grams of untreated copolymer.

Of the total amount, 373 grams was ground in a Waring Blendor, washed twice with successive washings of methanol and ether, and dried overnight in a vacuum oven set at 60° C. Total amount of copolymer recovered was 303 grams. Of this amount, 298 grams was boiled in distilled water for 3 hours, filtered, washed with methanol and ether and dried at 60° C.

The dried copolymer had a melting point of 178–183° C. and a sulfur content of 2.27%. This sulfur content indicates a 1-oxa-4,5-dithiacycloheptane content of about 4.9%. The copolymer had an inherent viscosity, measured at 60° C. in p-chlorophenol with 2% alpha-pinene, of 0.87. The $k_{222}$ value of the polymer was 0.76 in air and 0.30 in nitrogen.

*Example 8*

A mixture of 30 grams of polymer-free trioxane and 1 cc. of 1-oxa-4,5-dithiacycloheptane were heated to 70° C. with constant agitation. Thereupon, 0.05 cc. of BF₃ etherate was added to the mixture. Polymerization started as soon as the catalyst was added and was complete in one minute. The polymer was allowed to stand overnight at room temperature. Total yield was 25 grams of untreated copolymer. The resulting solid was ground in a Waring Blendor, washed twice with successive washings of methanol and ether and dried overnight in a vacuum oven set at 60° C. to form a particulate, dry, free-flowing white solid having a melting range of 180–182° C.

Analysis of the product showed that it contained 2.20% by weight of sulfur which corresponds to a copolymer having 4.7% by weight of the comonomer units.

The inherent viscosity, measured at 60° C. in p-chlorophenol containing 2% by weight alpha-pinene was 0.52.

It is, of course, to be understood that the foregoing examples are intended to be illustrative only and that numerous changes can be made in the ingredients, proportions, and conditions set forth therein without departing from the spirit of the invention as defined in the appended claims.

We claim:

1. A solid high molecular weight copolymer of trioxane and a cyclic disulfide having 5 to 13 atoms in its ring and wherein the two sulfur atoms are adjacent.

2. A solid high molecular weight copolymer as in claim 1 which has a melting point of 180°–185° C. and an inherent viscosity of about 0.5 to 2.0 in p-chlorophenol containing 2% by weight of alpha-pinene at 60° C.

3. A solid, high molecular weight, linear copolymer containing from 99.99% to 75% by weight of —CH₂O— units derived from trioxane and, randomly dispersed among such —CH₂O— units, up to 25% by weight of units formed by the ring opening of at least one cyclic compound having the initial structure

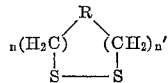

in which n and n' are selected from the integers 1 to 4, and R is selected from the group consisting of —CH₂—, —O—, and —O—CH₂—O—.

4. A copolymer as in claim 3 which contains up to about 98% of said recurring —CH₂O— units derived from trioxane and about 2 to 8% of said open ring units.

5. A copolymer as in claim 3 in which the open ring units are formed from a compound having the structure

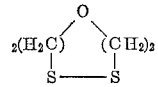

6. A copolymer as in claim 3 in which the open ring units are formed from a compound having the structure

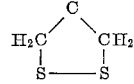

7. A copolymer as in claim 3 in which the open ring units are formed from a compound having the structure

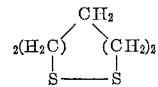

8. A copolymer as in claim 3, in which the open ring units are formed from a compound having the structure

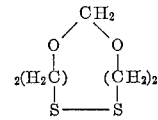

9. A process as in claim 11 and in which said catalyst is a boron trifluoride etherate.

10. A process as in claim 9 and in which said catalyst is boron trifluoride diethyl etherate.

11. A process which comprises copolymerizing trioxane and at least one organic, cyclic disulfide compound having 5 to 13 atoms in its ring in the presence of a Friedel-Crafts type catalyst and in bulk at a temperature of about 65° C. to 95° C.

12. A process which comprises copolymerizing trioxane and at least one organic, cyclic disulfide compound having 5 to 13 atoms in its ring in the presence of a Friedel-Crafts type catalyst and in solution in nitrobenzene at a temperature of about room temperature to the boiling point of the solvent.

References Cited by the Examiner

UNITED STATES PATENTS

| | | | |
|---|---|---|---|
| 1,991,765 | 2/1935 | Marks | 260—79 |
| 2,195,248 | 3/1940 | Hill et al. | 260—79.1 |
| 2,454,635 | 11/1948 | Curtis et al. | 260—67 |
| 2,457,224 | 12/1948 | Gresham | 260—2 |
| 2,657,198 | 10/1953 | Davis | 260—79.1 |
| 3,027,352 | 3/1962 | Walling et al. | 260—67 |

OTHER REFERENCES

Gipstein et al.: Jour. Polymer Science, vol. I, Pt. B. 1963, pp. 237–239.

WILLIAM H. SHORT, *Primary Examiner.*

L. M. MILLER, L. P. QUAST, *Assistant Examiners.*